(12) United States Patent
Ilev et al.

(10) Patent No.: US 7,787,106 B2
(45) Date of Patent: Aug. 31, 2010

(54) PARTICLE IMAGE VELOCIMETRY SYSTEM HAVING AN IMPROVED HOLLOW-WAVEGUIDE-BASED LASER ILLUMINATION SYSTEM

(75) Inventors: Ilko K. Ilev, Rockville, MD (US); Ronald A. Robinson, Germantown, MD (US); Ronald W. Waynant, Clarksville, MD (US)

(73) Assignee: The United States of America as represented by the Department of Health and Human Services, Washington, DC (US)

( * ) Notice: Subject to any disclaimer, the term of this patent is extended or adjusted under 35 U.S.C. 154(b) by 39 days.

(21) Appl. No.: 11/589,310

(22) Filed: Oct. 30, 2006

(65) Prior Publication Data
US 2007/0115455 A1 May 24, 2007

Related U.S. Application Data

(60) Provisional application No. 60/730,866, filed on Oct. 28, 2005.

(51) Int. Cl.
*G01P 3/36* (2006.01)
(52) U.S. Cl. .......................... 356/27; 356/28
(58) Field of Classification Search .................... 356/28, 356/27–28.5
See application file for complete search history.

(56) References Cited

U.S. PATENT DOCUMENTS 5,570,447 A * 10/1996 Liu .............................. 385/125
5,995,696 A * 11/1999 Miyagi et al. ................ 385/125
6,154,259 A * 11/2000 Hargis et al. ................. 348/756
6,411,765 B1 * 6/2002 Ono .............................. 385/131
6,771,870 B2 * 8/2004 Strobl et al. ................. 385/133
2004/0131311 A1 * 7/2004 Sergey et al. ................. 385/33
2006/0065333 A1 * 3/2006 Hackel et al. ................ 148/565

OTHER PUBLICATIONS

[Anderson D; Jones J; Easson W; Greated C; (1996), "Fiber-optic bundle delivery system for high peak power laser particle image velocimetry illumination," Rev. Sci. Instrum. 67, 2675-2679.*
Hand D; Entwistle D; Maier R; Kujn A; Greated C; Jones J (1999),"Fiber Optic Beam Delivery System for High Peak Power Laser PIV Illumination", Meas. Sci. Technology 10, 239-45.*

(Continued)

*Primary Examiner*—Thomas H Tarcza
*Assistant Examiner*—Timothy A Brainard
(74) *Attorney, Agent, or Firm*—Polsinelli Shughart PC; Teddy C. Scott, Jr.; Paul A. Jenny

(57) ABSTRACT

An illumination system for a particle image velocimetry system has an illumination source, a hollow tapered optical funnel arranged to receive illumination light from the illumination source, a hollow optical waveguide optically coupled to an output end of the hollow tapered optical funnel, and a beam shaping optical system optically coupled to an output end of the hollow optical waveguide. The illumination system is constructed to provide a light sheet to illuminate particles within a fluid under observation. A particle image velocimetry system has such an illumination system.

32 Claims, 5 Drawing Sheets

OTHER PUBLICATIONS

Anderson D; Jones J; Easson W; Greated C; (1996), "Fiber optic bundle delivery system for high peak power laser particle image velocimetry illumination," Rev. Sci. Instrum. 67, 2675-2679.*

Hand D; Entwistle D; Maier R; Kujn A; Greated C; Jones J (1999),"Fibre Optic Beam Delivery System for High Peak Power Laser PIV Illumination", Meas. Sci. Technology 10, 239-45.*

Ilko K. Liev et al, Attenuation measurement of infrared optical fibers by use of a hollow-taper-based coupling method, Jul. 2000, applied optics, vol. 39 No. 19, pp. 3192-3196.*

Susan J. Muller,Velocity Measurements in complex flows of non-Newtonian Fluids, Sep. 2002, Korean-Australia Rheology Journal, vol. 14 No. 3, pp. 93-105.*

Ilko Liev, Uncoated hollow taper as a simple optical funnel for laser delivery, Jul. 1999, Review of Scientific Instruments, vol. 70 No. 10, pp. 3840-3843.*

Helena Jelinkova, Hollow waveguide delivery systems for laser technology application, Dec. 2003, Progress in Quantum Electronics, vol. 28, issues 3-4, 145-164.*

Bertuccoili, Luca et al, A Submersible Particle Image Velocimetry System for Turbulence Measurements in the Bottom Boundary layer, Journal of Atmospheric and Oceanic Technology, vol. 16 issue 11, 1635-1646.*

Luca Bertuccioli et al, "A Submersible Particle Image Velocimetry System for Turbulence Measurements in the Bottom Boundary Layer", Nov. 1999, Journal of Atmospheric and Oceanic Technology, vol. 16, 1635-1646.*

Hunter, B. et al., Selecting a High-Power Fiber Optic Beam Delivery System Laser, *Institute of America Proceedings* 81E, (1996) 173-82.

Jones J., et al, "Fiber-Optic Beam Delivery Systems for Particle Image Velocimetry", *Optics and Lasers in Engineering*, 27, (1997), 657-74.

Stephens T., et al. "Fiber-Optic Delivery of High-Peak-Power Q-Switched Laser Pulses for In-Cylinder Flow Measurements", *Appl. Opt* 42, (2003), 4307-4314.

Robinson, R. et al., "Design and Optimization of a Flexile High-Peak-Power Laser-to Fiber Coupled Illumination System Used in Digital Particle Image Velocimetry", *Rev. Sci. Instrum.* 70 (2004), 4856-4862.

Ilev, I., "Grazing-incidence-based hollow taper for infrared laser-to-fiber coupling," *Applied Physics Letters*, 74, 2921-2923 (1999).

Ilev, I., Uncoated Hollow Taper as a Simple Optical funnel for Laser Delivery, Rev. Sci. Instrum., 70, 3840-43 (1999).

Ilev, I., et al., Ultraviolet Laser Delivery Using an Uncoated Hollow Taper, *IEEEE Journal of Quantum Electronics* 36, 944-48 (2000).

Matsuura Y., et al., Optical Properties of Small Bore Hollow Glass Waveguides, *Applied Optics*, 34, 6842-47 (1995).

Matsuura Y., et al., "Hollow Fibers for Delivery of Harmonic Pulses of a Q-Switched ND: YAG Lasers," *Applied Optics*, 41, 442-445 (2002).

Snyder, A., et al., "Optical Waveguide Theory," New York, Chapman and Hall (1983).

Miller, S. et al., "Otpical Fibers Telecommunications," Academic Press, New York (1989).

Powell, I., Design of a Laser Beam Line Expander, *Applied Optics*, 26, 3705-09 (1987).

Jelinkova, H., et al., Polymer-coated silver hollow glass waveguide for delivery of first and second harmonic ND:YAG laser picosecond pulses, *Proc. SPIE*, 4158, 86-06 (2000).

Ilev, I., et al., Attenuation measurement of infrared optical fibers by use of a hollow-taper-based coupling method, *Applied Optics*, 39, 19, 3192-3196 (2000).

* cited by examiner ated reflectance curves as a function of angle of incidence for

PARTICLE IMAGE VELOCIMETRY SYSTEM HAVING AN IMPROVED HOLLOW-WAVEGUIDE-BASED LASER ILLUMINATION SYSTEM

CROSS REFERENCE TO RELATED APPLICATIONS

This application claims priority to U.S. Provisional Application No. 60/730,866 filed Oct. 28, 2005, the entire contents of which are hereby incorporated by reference.

BACKGROUND

1. Field of Invention

The present invention relates to particle image velocimetry systems and methods of use, and particularly to particle image velocimetry systems that have hollow waveguide illumination systems.

2. Discussion of Related Art

Digital particle image velocimetry (DPIV) is an optical technique for measuring the velocity of particles suspended in a fluid flow field. The measurement area within the flow field is defined by the position and physical dimension of a fan of laser light. For effective digital particle image velocimetry (DPIV) illumination and accurate velocity measurements, the laser illumination system should provide a highly effective delivery of the beam from the laser source to the measurement region as well as the formation of a light sheet that satisfies some specific requirements such as the following: (1) thin (0.5-1.0 mm) but wide (10 mm or wider) laser illumination sheet, (2) uniform laser sheet profile, (3) high-peak-power laser delivery without damaging effects (high-peak-power density greater than 1 $GW/cm^2$), (4) flexible, precise placement, and able to access hard-to-reach regions, and (5) safe and confined laser delivery. According to these requirements, two basic DPIV illumination techniques have been developed recently: a bulk-optics-based illumination technique and a laser delivery technique based on a fiber-optic approach. The bulk-optics DPIV illumination technique utilizes a three-dimensional (3D) articulating arm (TSI, Minneapolis, Minn. and Oxford Lasers, Littleton, Mass.), including tubing, gears, and reflectance optics (a series of mirrors and prisms) to provide for accurate positioning of the high-energy laser sheet. This type of laser delivery technique does not provide a uniform beam because the laser itself is typically multimode and has a very peaked beam profile. In addition, the bulk optics systems are relatively expensive.

These difficulties can be overcome as well as satisfying the above-mentioned requirements when a fiber-optic laser delivery approach is employed. DPIV fiber-optic links have been proposed in recent publications in which the authors have demonstrated the use of either fiber bundles [Anderson D; Jones J; Easson W; Greated C; (1996), "Fiber-optic bundle delivery system for high peak power laser particle image velocimetry illumination," Rev. Sci. Instrum. 67, 2675-2679; Hunter B; Leong K; Miller C; Golden J; Glesias R; Layerity P (1996), Selecting a High-Power Fiber Optic Beam Delivery System Laser, Institute of America Proceedings 81E, 173-82; Jones J; Anderson D; Greated C; (1997), Fiber-Optic Beam Delivery Systems for Particle Image Velocimetry, Optics and Lasers in Engineering, 27, 657-74; and Hand D; Entwistle D; Maier R; Kujn A; Greated C; Jones J (1999), Fiber Optic Beam Delivery System for High Peak Power Laser PIV Illumination, Meas. Sci. Technology 10, 239-45] or diffraction optics [Stephens T; Haste M; Towers M; Thompson M; Taghizadeh M; Jones J; Hand D; (2003), Fiber-optic delivery of high-peak-power Q-switched laser pulses for in-cylinder flow measurements, Appl. Opt 42, 4307-4314] to deliver high-energy illumination for DPIV systems. The DPIV fiber-optic laser delivery systems offer advantages over conventional bulk-optics-based delivery techniques in terms of effective laser delivery, flexibility, miniaturization, simplified alignment, immunity to external influence (including vibrations and angular laser beam drift), and safe and confined laser delivery. These systems, however, demonstrate some limitations related to possible damage effects of the delivery fiber material when high-peak-power laser emission is used or to beam quality (focus ability) and laser sheet thickness if large-core-diameter fibers (usually exceeding 200 µm) are used. Because these difficulties are caused mainly by limitations of the delivery fiber itself, a detailed evaluation of damage threshold and optimization of critical fiber parameters were studied. Such results have been recently reported in the literature about both commercially available silica solid-core fibers (100-200 µm) and preliminary testing of an experimental prototype hollow waveguide (HW) [Robinson R; Ilev I (2004), Design and optimization of a flexible high-peak-power laser-to fiber coupled illumination system used in digital particle image velocimetry, Rev. Sci. Instrum., 70, 4856-4862]. There is thus a need for improved laser delivery systems for DPIV systems and DPIV systems that have such improved laser delivery systems.

SUMMARY

An illumination system for a particle image velocimetry system has an illumination source, a hollow tapered optical funnel arranged to receive illumination light from the illumination source, a hollow optical waveguide optically coupled to an output end of the hollow tapered optical funnel, and a beam shaping optical system optically coupled to an output end of the hollow optical waveguide. The illumination system is constructed to provide a light sheet to illuminate particles within a fluid under observation. A particle image velocimetry system has such an illumination system.

A method of determining a velocity of a particle in a fluid includes illuminating the particle with light that has passed through a hollow tapered optical funnel and a hollow optical waveguide assembly, detecting at least a portion of illumination light that is scattered by the particle at a first time and at a second time; and processing the data from the detecting to determine the velocity of the particle.

BRIEF DESCRIPTION OF THE DRAWINGS

The invention is better understood by reading the following detailed description with reference to the accompanying figures in which.

DETAILED DESCRIPTION

Figure 1:
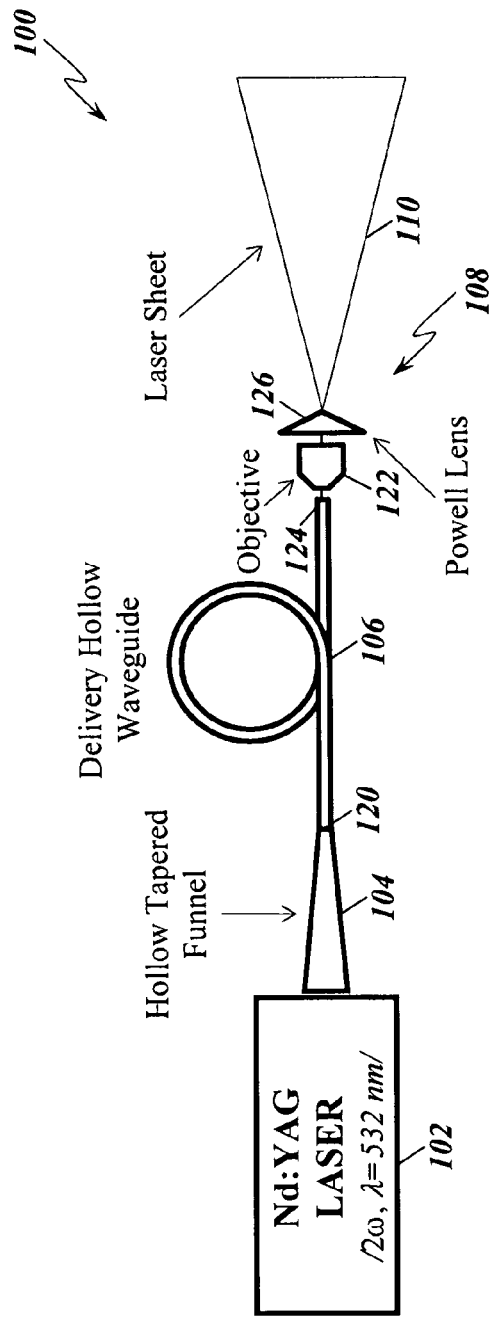
FIG. 1 is a schematic illustration of a particle image velocimetry (PIV) illumination system according to an embodiment of this invention.

FIG. 1 is a schematic illustration of an illumination system 100 for a particle image velocimetry system according to an embodiment of this invention. The illumination system 100 has an illumination source 102, a hollow tapered optical funnel 104 that is arranged to receive illumination light from the illumination source 102, a hollow optical waveguide 106 optically coupled to an output end of the hollow tapered optical funnel 104, and a beam shaping optical system 108 optically coupled to an output end of the hollow optical waveguide 106. The illumination system 100 is constructed to provide a light sheet 110 to illuminate particles within a fluid under observation.

Figure 2:
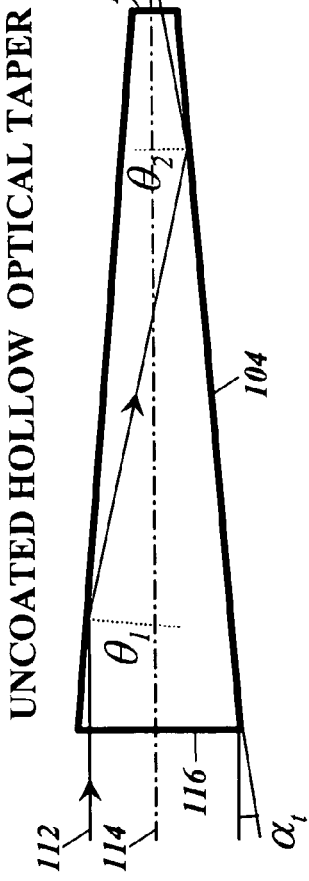
FIG. 2 is a schematic illustration of a hollow tapered optical funnel according to an embodiment of this invention.

The hollow tapered optical funnel 104 is illustrated in an enlarged view in FIG. 2. The hollow tapered optical funnel 104 has a cone angle $\alpha_t$ that is smaller than or about 1°. The hollow tapered optical funnel 104 is constructed such that the taper angle $\alpha_t$ is substantially uniform along the entire surface thereof. For example, linear sides of the hollow tapered optical funnel that are straight to within a tolerance of about ±0.2% were found to work well. Furthermore, a uniform optically smooth surface along the interior of the hollow tapered optical funnel 104 is desired. The angles $\theta_1$ and $\theta_2$ are angles of incidence of the light ray 112 represent schematically in FIG. 2. Consequently, one can see that the light ray 112 entering the hollow tapered optical funnel 104 substantially parallel to the optical axis 114 of the hollow tapered optical funnel 104 strikes the hollow tapered optical funnel 104 at a very shallow grazing angle of about 1° or less to the surface of the hollow tapered optical funnel 104, which corresponds to being about 1° or less from a 90° angle of incidence. Under such conditions, light rays, such as 112, are reflected with a reflection coefficient of nearly 100%. This holds true substantially independently of the wavelength of light.

The term "light" is used in this application in a very broad sense. It does not imply visible light. It refers to electromagnetic radiation generally. For example, it is intended to encompass infrared, visible, ultraviolet and other regions of the electromagnetic spectrum. Similarly, the term "optical" is not intended to be limited to a specific region of the electromagnetic spectrum.

In general, the hollow tapered optical funnel 104 may be constructed from various materials as long as the refractive index of the material is greater than 1.0. One may select particular materials that are suitable to construct the hollow tapered optical funnel 104 to within the required optical smoothness and design limitations for straightness of the sides. Glass materials have been found to be suitable as a material for the hollow tapered optical funnel 104. In particular, PYREX glass has been found to work well for the material of the hollow tapered optical funnel 104. However, the broad concepts of this invention are not limited to such particular materials. In addition, the hollow tapered optical funnel 104 was found to provide good results when it was left uncoated.

The hollow tapered optical funnel 104 has an input end 116 that is sufficiently wide to accept a desired portion of a beam of light from the illumination source 102. The hollow tapered optical funnel 104 has an output end 118 that may be selected to have a size corresponding to an input end 120 of the hollow optical waveguide 106. The hollow optical waveguide 106 can be a hollow optical fiber according to an embodiment of this invention. The hollow optical waveguide 106 may be coated with a material that is selected to reduce transmission losses of light propagating through it. The coating around the hollow optical waveguide 106 may be selected according to the operating wavelength of the illumination system 100. For example, a cyclic olefin polymer material for a coating around hollow optical waveguide 106 was found to be suitable for illumination wavelengths of 532 nm.

The illumination source 102 may have a laser to provide illumination light to the hollow tapered optical funnel 104. For example, a Nd:YAG laser providing a second harmonic output wavelength of 532 nm was found to be suitable. However, the broad concepts of this invention are not limited to a specific laser or a specific operating wavelength. The illumination source 102 may be a pulsed laser or may include a continuous wave (cw) laser.

The beam shaping optical system 108 may include an objective lens 122 arranged to receive at least a portion of the light that emerges from the output end 124 of the hollow optical waveguide 106. The objective lens 122 can be selected in accordance with the numerical aperture of the light emerging from the output end 124 of the hollow optical waveguide 106 to provide a substantially collimated output beam. The substantially collimated output beam from the objective lens 122 may be directed into a Powell lens 126 to spread the output beam into a thin sheet of illumination light that is thin in the direction perpendicular to the paper of FIG. 1. The beam shaping optical system 108 can also spread the output beam into a wide sheet of illumination light that is wide at an illumination position within an illuminated fluid as shown in FIG. 1. The objective lens 122 may be a single lens element or a compound lens. Furthermore, the beam shaping optical system is not limited to these specific components illustrated in this example. One may choose various refractive, diffractive, or gradient index lenses, prisms, etc. to achieve a desired beam shaping without departing from the general concepts of the current invention.

In operation, the illumination source 102 provides an input beam of illumination light into the hollow tapered optical funnel 104. Very little light is lost as it traverses the hollow tapered optical funnel 104 due to the condition of grazing-incidence reflection. In addition, the hollow tapered optical funnel 104 provides an output beam at the output end 118 of the hollow tapered optical funnel 104 that has a substantially Gaussian intensity distribution across the output end 118. The light beam output from the output end 118 of the hollow tapered optical funnel 104 is coupled into the input end 120 of the hollow optical waveguide 106. The hollow optical waveguide 106 is flexible and 2 m in length, and may be moved, redirected and/or arranged to a desired position. Light travels along the hollow optical waveguide 106 and exits at the end 124 of the hollow optical waveguide 106. The hollow optical waveguide 106 has a small numerical aperture (0.05) compared to that of a solid optical waveguide, such as a silica solid-core optical fiber.

Light that is output from the end 124 of the hollow optical waveguide 106 is received by the objective lens 122, which collimates the light to introduce a collimated beam of light into the Powell lens 126. The Powell lens 126 spreads the collimated beam of light into a wide, thin illumination sheet.

Figure 3:
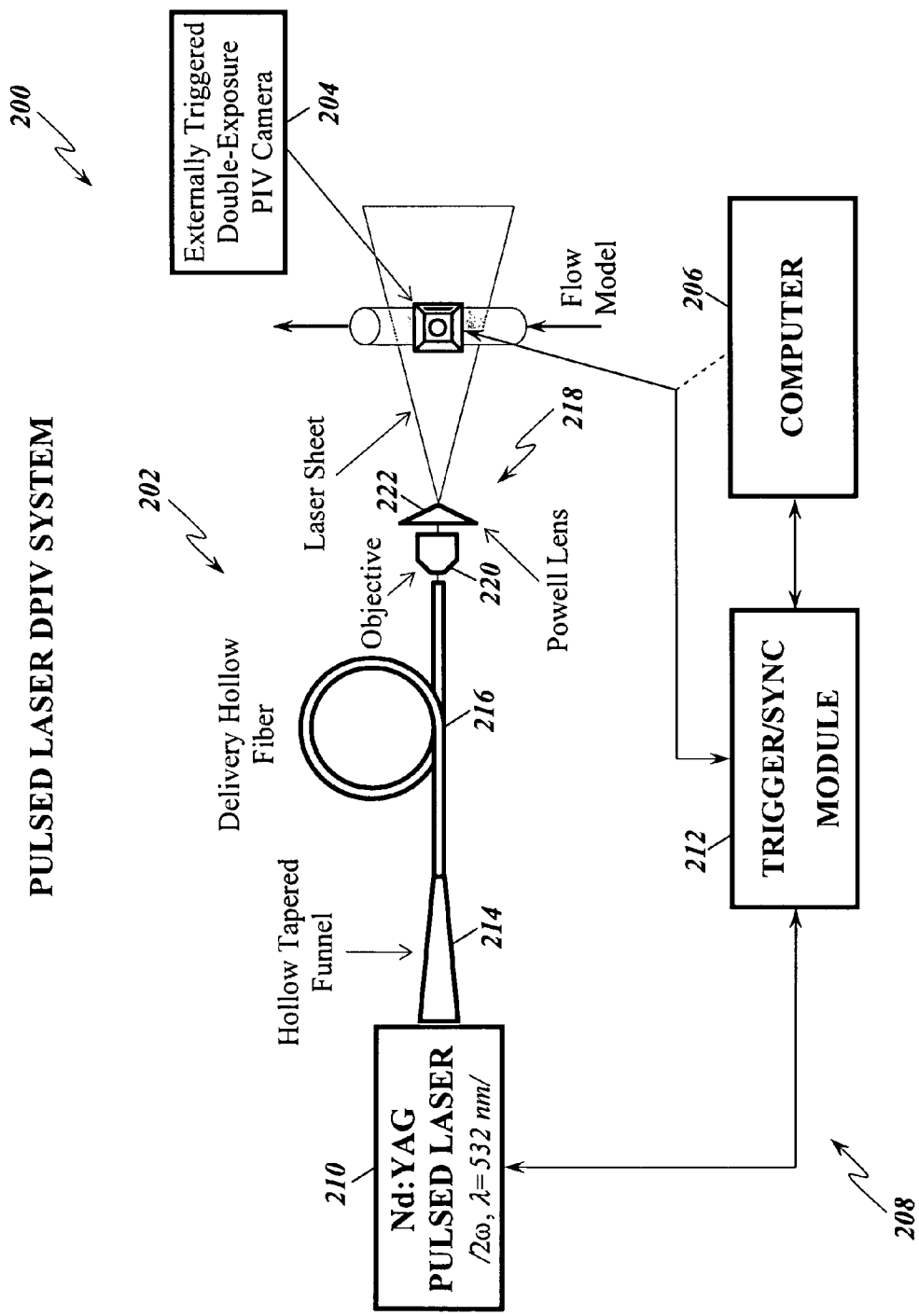
FIG. 3 is a schematic illustration of a PIV system according to an embodiment of this invention.

FIG. 3 is a schematic illustration of a particle image velocimetry (PIV) system 200 according to an embodiment of the current invention. The particle image velocimetry system 200 in this example is a digital particle image velocimetry (DPIV)

system. The particle image velocimetry system 200 has an illumination system 202, a detection system 204, and a signal processing system 206. The illumination system 202 has an illumination source 208 that includes a pulsed laser 210 and a trigger synchronization module 212. Similar to the embodiment of FIG. 1, the illumination system 202 may include a hollow tapered optical funnel 214, a hollow optical waveguide 216, and a beam-shaping optical system 218. The hollow tapered optical funnel 214 may be similarly constructed as the hollow tapered optical funnel 104 of the illumination system 100 illustrated schematically in FIGS. 1 and 2. Similarly, the hollow optical waveguide 216 may be similarly constructed as the hollow optical waveguide 106. The beam-shaping optical system 218 may include an objective lens 220 and a Powell lens 222 similar to that of the embodiment of FIG. 1. The detection system 204 can be a double-exposure PIV camera in this embodiment of the invention. The signal processing system 206 can be a computer programmed to process signals from the detection system 204.

In the operation of this embodiment of the invention, the pulsed laser 210 may be triggered to provide pairs of pulses of illumination light that are detected by the detection system 204 after being scattered by particles under observation. The detection system 204 is in communication either directly or indirectly with the signal processing system 206. Signals from the detection system 204 may then be processed by the signal processing system 206. For example, pairs of signals corresponding to the pairs of pulses may be cross-correlated to obtain velocity information about particles illuminated within the flow.

Figure 4:
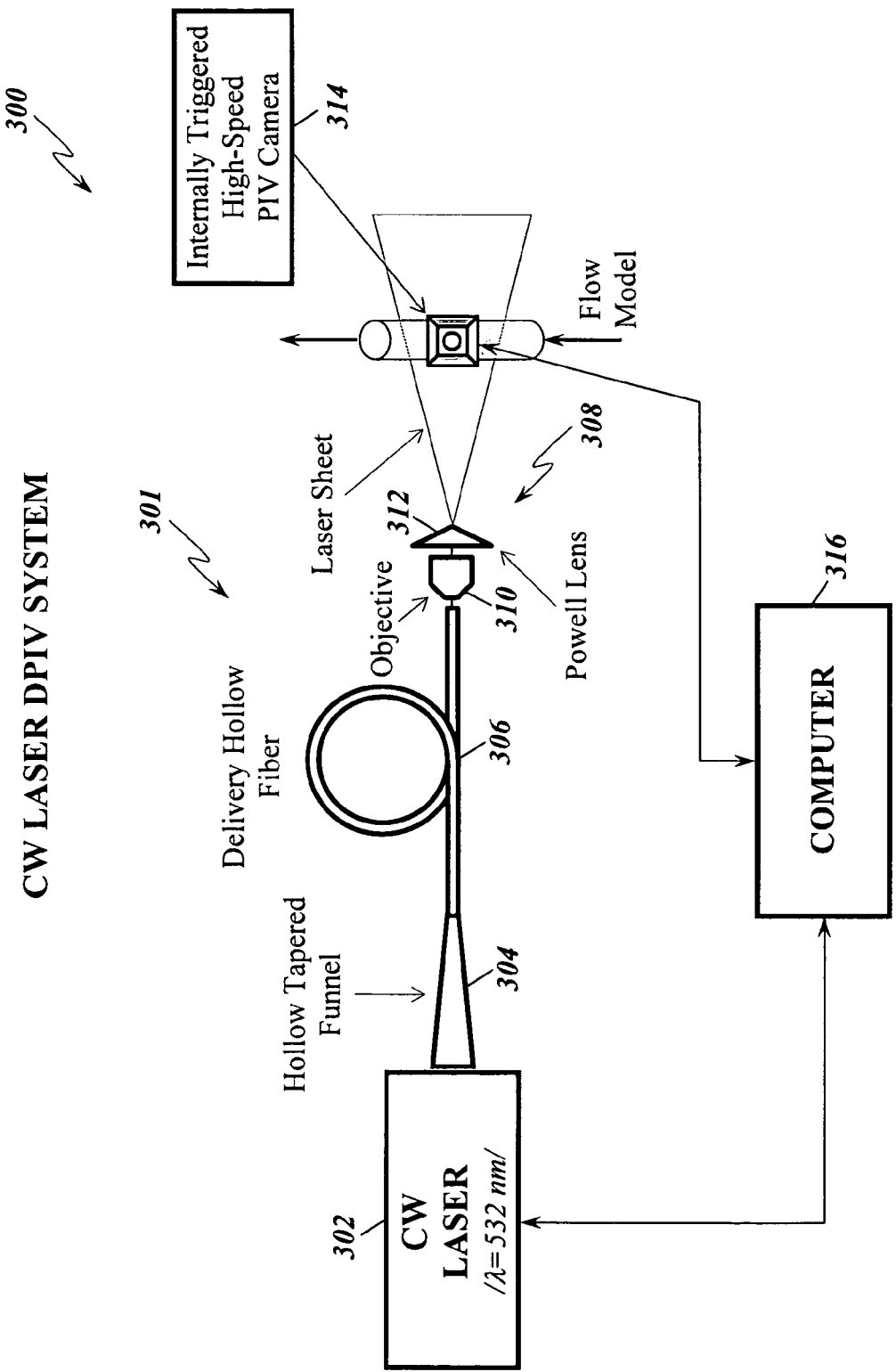
FIG. 4 is a schematic illustration of a PIV illumination system according to another embodiment of this invention.

FIG. 4 is a schematic illustration of a particle image velocimetry system 300, according to another embodiment of the current invention. In this example, the particle image velocimetry system 300 is a digital particle image velocimetry system. The particle image velocimetry system 300 has an illumination system 301 that includes a continuous wave (cw) laser illumination source 302. Similar to the embodiments of FIGS. 1 and 3, the illumination system 301 may includes a hollow tapered optical funnel 304, a hollow optical waveguide 306, and a beam shaping optical system 308. The hollow tapered optical funnel 304 may be similarly constructed as the hollow tapered optical funnel 104 of the illumination system 100 illustrated schematically in FIGS. 1 and 2. The hollow optical waveguide 306 may be similarly constructed as the hollow optical waveguide 106. The beam shaping optical system 308 may have an objective lens 310 and a Powell lens 312 similar to that of the embodiment of FIG. 1.

The particle image velocimetry system 300 also has a detection system 314. In particular, the detection system 314 may be an internally triggered high-speed particle image velocimetry camera according to this embodiment of the invention. The detection system 314 is arranged to detect light from particles illuminated by the illumination system 301 and to output a signal to be processed. A signal processing system 316 is in communication with the detection system 314. The signal processing system 316 may be a computer that is programmed to process signals received from the detection system 314. The signal processing system 316 may also provide signals to the detection system, for example, a trigger signal. The signal processing system 316 may also be in communication with the illumination system 301.

In operation, the illumination system 301 illuminates particles in a fluid flowing through a measurement region. The detection system 314 detects light scattered from particles within the fluid, and provides a signal to the signal processing system 316 to process the signals to obtain velocity information about the particles detected within the fluid. For example, the signal processing system 316 may be a computer programmed to perform cross-correlation analysis between signals at two different times received by a triggered PIV camera.

EXAMPLES

An embodiment of the present invention demonstrates a novel and simple flexible all-hollow-waveguide laser delivery system designed for effective DPIV measurements. This system provides for significantly higher laser energy delivery using an uncoated glass-tapered funnel [Ilev I; Waynant R (1999), Grazing-incidence-based hollow taper for infrared laser-to-fiber coupling, *Applied Physics Letters,* 74, 2921-2923; Ilev I; Waynant R (1999), Uncoated Hollow Taper as a Simple Optical Funnel for Laser Delivery, *Rev. Sci. Instrum.* 70, 3840-43; Ilev I; Waynant R; Ediger E; Bonaguidi M, (2000), Ultraviolet Laser Delivery Using an Uncoated Hollow Taper *IEEE Journal of Quantum Electronics* 36, 944-48], and an improved cyclic olefin polymer (COP)-coated hollow glass fiber waveguide system [Matsuura Y; Abel T; Harrington J (1995) Optical Properties of Small Bore Hollow Glass Waveguides, Applied *Optics* 34, 6842-47; Matsuura Y; Takada G; Yamamoto T; Shi Y; Miyagi M, (2002), Hollow Fibers for Delivery of Harmonic Pulses of a Q-Switched Nd:YAG Lasers, *Applied Optics* 41, 442-445] optimized for a typical DPIV laser wavelength of 532 nm according to an embodiment of the invention.

A flexible and movable fiber-optic coupling link for delivery of the laser energy has two important technical advantages according to an embodiment of the current invention. First, it allows both the laser and the target illumination site to be fixed in position, while the coupled fiber-optic link allows manipulation of the laser energy to illuminate or radiate various points of interest. Second, the use of a fiber-optic link can provide a more uniform and smooth output laser beam profile from the multimode laser. The formation of the smooth beam profile can be attributed to the unique fiber feature that converts a relatively low-mode-number intensity distribution at the input laser beam (containing random fluctuations and strong energy peaks) into a high-quality homogeneous output beam profile containing a large number of both low- and high-order modes. Besides the laser beam homogenizing effects, a fundamental problem when solid-core silica optical fibers are used as a laser delivery medium is also the possible damage effects of the fiber material, especially when powerful laser emission is applied. Thus, our study on optimization of high-peak-power fiber-optic DPIV illumination systems is focused on the development of an alternative all-hollow-waveguide approach based on a hollow-tapered-funnel-to-hollow-waveguide coupling system for maximum peak-power laser delivery without damage effects.

The solid silica-core fibers described previously [Robinson and Ilev (2004)] are all commercially available, but are subject to damage effects when high-peak power laser emission is used. However, higher laser power delivery is needed for close-up micro-DPIV applications which would exceed the damage threshold of most of the tested solid-core fibers.

In order to address this problem, we designed, developed, and tested an innovative taper-to-fiber DPIV illumination system such as that illustrated schematically in FIG. 1. This system incorporates two optical hollow waveguide components: an uncoated funnel-shaped hollow glass taper for a direct laser-to-taper coupling and a flexible hollow core waveguide for precise high-peak-power laser delivery.

Figures 5, 6:
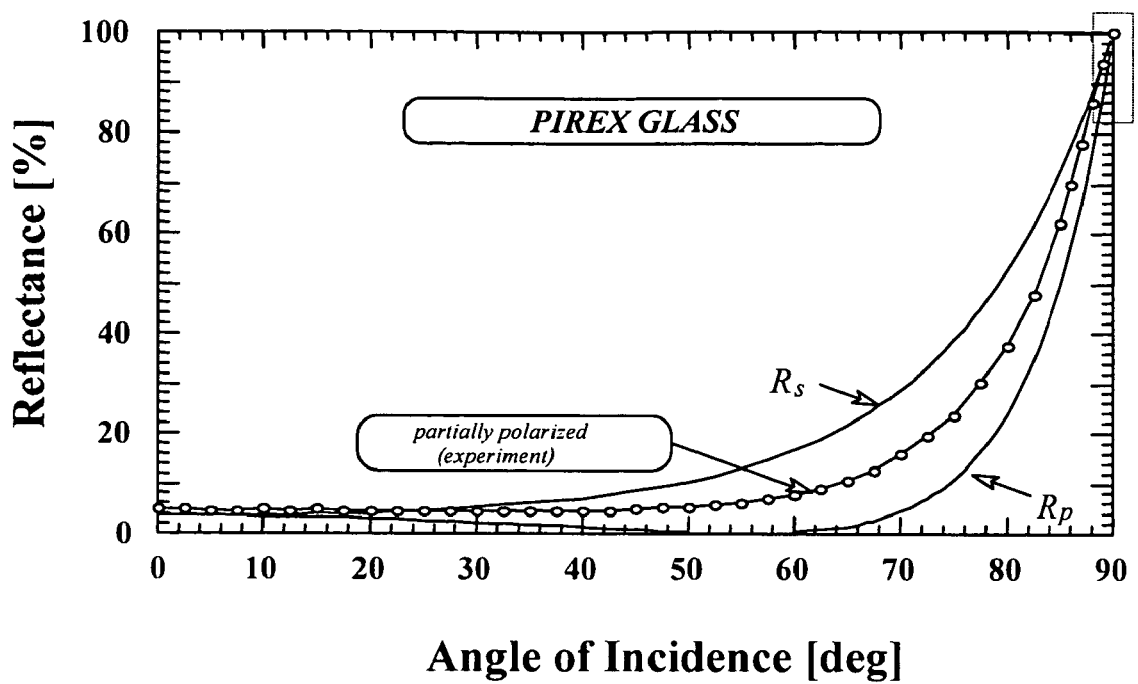
FIG. 5 shows experimental and p- and s-polarized calculated reflectance curves as a function of angle of incidence for a hollow tapered optical funnel according to an embodiment of this invention.
FIG. 6 shows measured damage thresholds for several optical fibers.

The uncoated hollow glass optical taper is used for direct lens-free launching of laser radiation, including from powerful lasers into fibers and hollow waveguides. The operating principle of this taper is based on the light grazing-incidence effect when the reflectance coefficients at a dielectric boundary approach 100% at angles of incidence close to 90°. A typical geometry of the funnel-shaped hollow taper is illustrated schematically in FIG. 2. In this example, it is an uncoated glass taper with a small (smaller than 1°) cone angle, $\alpha_t$. The use of tapers with such a small cone angle leads to nearly 90° incidence angles at the sequential reflections of a laser beam propagating into the taper (for instance, the incidence angles $\theta_1$ and $\theta_2$ in FIG. 2). Thus, conditions for the grazing incidence into the taper are created that lead to substantially the achievement of the maximum reflectance coefficients. FIG. 5 shows analytical Fresnel's dependencies (continuous curves) of the reflectance coefficients Rs and Rp, corresponding to the s- and p-polarized light components as a function of angle of incidence as well as an experimentally registered dependence (discrete points) obtained at the single reflection of a partially polarized laser beam at a Pyrex-glass surface for such an example of an uncoated hollow tapered optical funnel.

Furthermore, a significant advantage when the grazing incidence effect is applied to laser delivery systems is maintaining high reflectance coefficients in various spectral regions that allow us to utilize one and the same uncoated hollow taper for laser radiation with different wavelengths including in the ultraviolet, visible and infrared spectral ranges. FIG. 5 illustrates the potential of the grazing incidence effect for laser delivery based on both the analytical dependencies (continuous curves) and the experimental curve (discrete point) obtained by using the classical Fresnel's equations of light reflection between the reflectance coefficients $R_s$ and $R_p$ of the s- and p-polarized light components and the angle of incidence $\theta_1$ at a boundary between two dielectric media. In this case, the reflectance coefficients are computed for a Pyrex-glass surface (n=1.46 in the visible range), the optical material from which the hollow tapers used in our experiment are constructed. As can be seen, the reflectance coefficients rise rapidly to 100% at angles of incidence close to 90°, that is, at the so-called regime of grazing incidence. Thus, we can conclude that the achievement of substantially the maximum reflectance coefficients at the grazing incidence regime can be exploited as an optical waveguide effect in uncoated hollow tapers and therefore, can be used for the development of such tapers for highly effective laser delivery and coupling including in DPIV systems.

In addition, an essential advantage of the suggested DPIV hollow-taper-based laser delivery system is that the laser radiation at the taper output has essentially a homogeneous structure and small divergence. The specific potential of the hollow taper to serve as a mode converter that transforms the strongly multimode distribution of the input laser emission into a high-quality smooth Gaussian-shaped profile at the taper output can be attributed to the mutual action of the following factors. 1) The specific parallel laser excitation of the hollow taper provides the most appropriate conditions for grazing incidence reflection within the taper. Moreover, the direct parallel laser launching contributes to more effective excitation predominantly of low-order local normal modes [LNM's introduced in the mode coupling theory; Snyder A; Love J (1983) Optical Waveguide Theory, New York, Chapman and Hall; Ilev et al. (2000)] which propagate in a nearly coaxial manner. 2) Because of core diameter variations along the taper length, mode coupling processes occur when the laser emission propagates into the taper. These processes lead to redistribution of the optical power among the guided LNM's in the taper and to formation of an upward power flow produced by the mode conversion of lower-order to higher-order modes. 3) The optical taper possesses a unique property to serve as a mode filter that decreases the amplitudes of the high-order guided LNM's, since their more intensive conversion into leaky (basically refractive) LNM's. The mode filtering effect in our experiment, where we use hollow tapers rather than solid-core tapers, is more strongly evident since the grazing incidence effect as a criterion for refraction-mode formation in hollow tapers is a much stronger requirement than the total internal reflection in solid-core tapers. Furthermore, because of the lower power density of the output laser beam and its high quality profile, the taper ensures higher damage threshold for the delivery waveguide in comparison to the conventional lens laser-to-fiber coupling.

To improve the high-peak-power delivery capability of the proposed all-hollow-waveguide DPIV illumination system, instead of a conventional solid-core fiber link, we have used a 700-μm-core-diameter cyclic olefin polymer (COP)-coated hollow glass waveguide which is designed to minimize the waveguide attenuation losses at a typical DPIV laser wavelength of 532-nm. Typically, the attenuation losses in the HW are about 1-2 orders of magnitude higher than those of solid-core delivery fibers. In our case, using the conventional "cutback" technique [Miller S; Chynoweth A; Editors (1989), Optical Fiber Telecommunications. Academic Press, New York], we measured the HW losses of 1.3 dB/m. The bending losses of this HW are about 2 dB/m at a bending radius of 30 cm [Matsuura et al].

This waveguide provides a significantly higher laser power delivery capability and higher damage threshold.

We used two different coupling methods for mounting the 700-μm-core-diameter HW with the 830 μm funnel output aperture, and evaluated the coupling efficiency of each. The first method involved inserting the smaller HW 1 mm inside the larger funnel output port, and placing a drop of ethyl cyanoacrylate at the junction to lock the fiber and funnel in place. We then placed shrinkable tubing around the junction to further stabilize the coupling junction. The second method used, which was designed for higher coupling efficiency involved the use of three-way micrometer adjustable mounts in order to position the HW near the funnel output and align it for maximum laser output energy. Alignment was critical for this method, but a 10% increase in laser energy output was achieved as the funnel output diameter and HW input diameter were aligned more closely than for the previous coupling method.

Results and Discussions

To test and evaluate fundamental features of the new all-hollow-waveguide laser delivery DPIV link, we have investigated basic transmission and spatial characteristics of this system.

FIG. 6 is a table showing damage threshold peak energy (mJ) and peak power density GW/cm$^2$ values for both solid-core and hollow-waveguide laser delivery DPIV systems. We quantified the transmission properties and peak power density damage threshold values for both solid-core fiber and hollow-core waveguide delivery link systems, and evaluated the peak-power laser delivery capability for DPIV applications. FIG. 6 presents comparative data in evaluating damage thresholds of solid-core silica fibers and a first generation HW fiber. The data shows the peak incident energy ($E_P$) in mJ and, the calculated peak power density ($P_{pd}$) in GW/cm$^2$ as the measured damage threshold values for the four delivery fibers tested in this study. The measured damage threshold level was that laser energy level that immediately decreased the laser light output, and was determined for three trials, resulting in a mean and standard deviation. These measured damage thresholds were consistent with the only quoted damage level (assumed safety factor of 2-3) for the high-power delivery fiber (OFS Fitel HCGMO200T 200 µm), which was conservatively quoted to be 1 GW/cm$^2$. For the funnel-to-HW coupling methods (delivery HW inserted into funnel or abutted to the funnel) we measured the laser output energy, the output energy from the funnel coupled to the laser, and finally the output energy from the HW coupled to the funnel and laser. The laser output energy was measured to be about 30 mJ±1 mJ at the maximum laser output setting. The loss through the funnel was measured to be about 30% of the input laser energy, which corresponds to a laser-to-taper coupling efficiency of 70%. The loss through the insertion coupled HW was about 40%, which provided a total laser energy delivery efficiency of 30%. The abutted coupling HW increased that number to 40%. At the maximum input laser energy of 30 mJ, the measured energy output from the HW varied between 10 and 13 mJ for the two coupling methods employed.

Figures 7A, 7B, 7C:
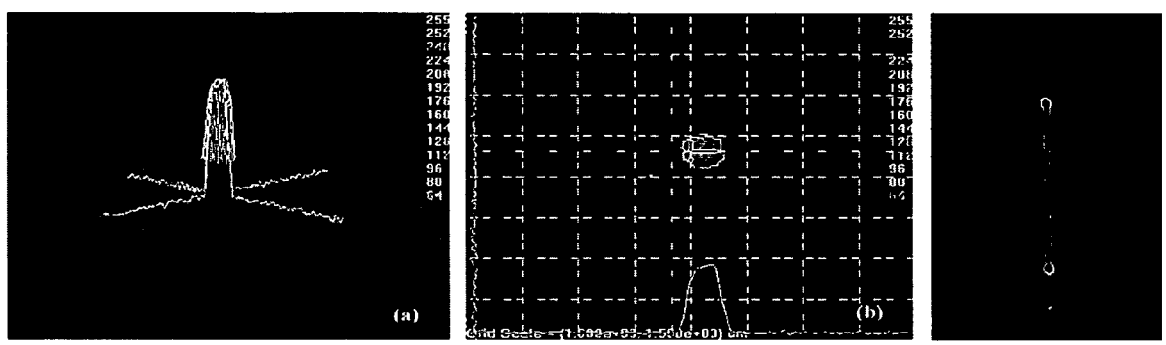
FIG. 7(a) shows a 3D and FIG. 7(b) a 2D illumination beam profile according to an embodiment of the current invention.
FIG. 7(c) shows a ≦1 mm illumination beam along the direction of travel of light according to an embodiment of the current invention.

For testing the spatial laser beam profile characteristics related to the new all-hollow-waveguide laser delivery system, we measured two-(2-D) and three-dimensional (3-D) beam distributions at the delivery output. FIG. 7 illustrates typical 3D (FIG. 7(a)) and 2D (FIG. 7(b)) uniform beam profiles. These high-quality smooth intensity distributions are formed as a result of the mode-homogenizing effect on the input multimode laser beam profile due to specific hollow taper properties, the direct taper-to-HW coupling, and the specific HW feature to maintain predominantly low-order coaxial modes concentrated around the waveguide axis.

Because of the relatively large numerical aperture of solid-core fibers resulting in a poor focusing and a shallow depth of field, the use of solid-core-fiber-based DPIV laser delivery systems requires much higher laser energy levels. However, this requirement is limited by the major disadvantage of the solid-core silica fibers, which is their lower peak laser energy damage threshold level. To address this increased illumination requirement for higher delivered power DPIV applications, we utilized the taper-to-HW delivery system described previously. An advantage of this system is that, because of the smooth profile and lower power density of the output laser beam, it ensures high damage threshold for the delivery HW. As a result, no damage effects ever occurred in our experiments, even at the maximum measured laser output of 30 mJ for the two sequential laser pulses, and therefore more laser energy could be obtained with a higher energy laser. Another advantage of the taper-to-HW technique is that both the hollow taper and HW have very low numerical apertures (~0.05 versus 0.22 for the silica solid-core fiber). This low numerical aperture results in a very small diverging angle which, in addition to the uniform smooth laser beam profile at the HW output (FIG. 7), helps produce a thin laser sheet using a 4× microscope objective as the input to the Powell sheet generator lens [Powell I (1987), Design of a laser Beam Line Expander, *Applied Optics* 26, 3705-09]. The measured peak power density impinging on the fiber was 0.86 GW/cm$^2$ at maximum laser energy output (30 mJ) over a 700-µm-diameter laser beam diameter (fiber-core area A=0.0038 cm$^2$). It has been reported in the literature that in the nanosecond pulse width range at the same laser pumping wavelength (532 nm), this HW can handle laser energy levels of 90 mJ without damage [Matsuura et al. (2002)]. Using an identical 700-µm core-diameter COP HW, the authors [Jelinkova H; Cerny P; Sulc J; Kubecek V; Miyagi M; Shi Y; Matsuura Y (2000), Polymer-coated silver hollow glass waveguide for delivery of first and second harmonic Nd:YAG laser picosecond pulses, *Proc SPIE* 4158, 86-96] achieved a HW damage threshold of 48 GW/cm$^2$ at laser delivery of 40 ps pulse duration 532-nm-wavelength Nd:YAG pulses. The suggested all-hollow-waveguide DPIV laser delivery system demonstrates much promise and easily exceeds the damage threshold for the solid-core silica fibers (particularly when dirt is present on the silica fiber face).

Conclusion

This example demonstrates a novel flexible high-peak-power all-hollow-waveguide DPIV laser delivery design using an uncoated funnel-shaped hollow glass taper for a direct laser-to-taper coupling and flexible high-damage-threshold hollow-core glass waveguides for precise high-peak-power laser delivery. This system can have the following basic advantages in comparison with the currently available bulk-optics DPIV illumination systems or solid-core delivery fibers:

(1) The all-hollow-waveguide laser delivery system includes an effective hollow-taper-based coupling that provides a direct, lens-free launching of laser emission into the delivery hollow waveguide.

(2) Based on the grazing incidence effect, the uncoated funnel-shaped hollow taper serves as a mode homogenizer and ensures a smooth Gaussian-shaped profile of the output laser emission.

(3) The hollow-core glass delivery waveguide can provide a significantly higher laser power delivery capability and higher damage threshold.

(4) The all-hollow-waveguide DPIV laser delivery system can offer advantages in terms of:
  (a) formatting thin (0.5-1.0 mm), wide (10 mm or wider) and uniform laser illumination sheet;
  (b) high-peak-power laser delivery without damaging effects (>1 GW/cm$^2$),
  (c) flexibility, miniaturization, and simplified alignment;
  (d) immunity to external influence (including vibrations and angular laser beam drift);
  (e) safe and confined laser delivery.

The embodiments and particular examples described herein are intended to help explain various concepts of the invention. The invention is not intended to be limited to these particular embodiments and examples. One of ordinary skill in the art would recognize that numerous modifications and alternatives are possible within the teachings of this invention without departing from the scope of the invention, which is defined by the appended claims.

We claim:

1. An illumination system for a particle image velocimetry system comprising:
   an illumination source;
   a hollow tapered optical funnel arranged to receive illumination light from said illumination source;
   a hollow optical waveguide optically coupled to an output end of said hollow tapered optical funnel; and
   a beam shaping optical system optically coupled to an output end of said hollow optical waveguide, wherein said illumination system is constructed to provide a light sheet to illuminate particles within a fluid under observation.

2. The illumination system for a particle image velocimetry system according to claim 1, wherein said hollow tapered optical funnel has a cone angle that is smaller than 1° so that illumination light from said illumination source is at a grazing incidence within about 1° of a 90° angle of incidence.

3. The illumination system for a particle image velocimetry system according to claim 1, wherein said hollow tapered optical funnel is an uncoated material having a refractive index at an operating wavelength that is greater than 1.0.

4. The illumination system for a particle image velocimetry system according to claim 3, wherein said uncoated material is a glass material.

5. The illumination system for a particle image velocimetry system according to claim 4, wherein said glass material is PYREX glass.

6. The illumination system for a particle image velocimetry system according to claim 1, wherein said hollow optical waveguide is a hollow optical fiber having a coating of a material selected to reduce transmission losses for the wavelength of the illumination source.

7. The illumination system for a particle image velocimetry system according to claim 6, wherein said coating of said optical fiber is a cyclic olefin polymer coating.

8. The illumination system for a particle image velocimetry system according to claim 1, wherein said illumination source comprises a laser having a 532 nm output wavelength.

9. The illumination system for a particle image velocimetry system according to claim 1, wherein said illumination source comprises a pulsed laser.

10. The illumination system for a particle image velocimetry system according to claim 1, wherein said illumination source comprises a continuous wave laser.

11. The illumination system for a particle image velocimetry system according to claim 9, wherein said pulsed laser is a Nd:YAG pulsed laser having a 532 nm output wavelength.

12. The illumination system for a particle image velocimetry system according to claim 1, wherein said beam shaping optical system comprises an objective lens arranged to receive at least a portion of light that emerges from said output end of said hollow optical waveguide to provide a collimated output beam.

13. The illumination system for a particle image velocimetry system according to claim 12, wherein said beam shaping optical system further comprises a Powell lens arranged to receive said collimated output beam from said objective lens to form a sheet of illumination light.

14. The illumination system for a particle image velocimetry system according to claim 13, wherein said sheet of illumination light has a thickness in a range from about 0.5 mm to about 1.0 mm.

15. The illumination system for a particle image velocimetry system according to claim 13, wherein said sheet of illumination light has a width in a detection region of at least about 10 mm.

16. The illumination system for a particle image velocimetry system according to claim 1, wherein said illumination system is able to provide a peak power density of at least 1 $GW/cm^2$.

17. A particle image velocimetry system, comprising:
an illumination system arranged to illuminate particles within a fluid flow;
a detection system arranged to detect light from particles illuminated by said illumination system and to output a signal to be processed; and
a signal processing system constructed to be in communication with said detection system to receive said signal to be processed,
wherein said illumination system comprises:
an illumination source;
a hollow tapered optical funnel arranged to receive illumination light from said illumination source;
a hollow optical waveguide optically coupled to an output end of said hollow tapered optical funnel; and
a beam shaping optical system optically coupled to an output end of said hollow optical waveguide, wherein said illumination system is constructed to provide a light sheet to illuminate particles within a fluid under observation.

18. The particle image velocimetry system according to claim 17, wherein said hollow tapered optical funnel has a cone angle that is smaller than 1° so that illumination light from said illumination source is at a grazing incidence within about 1° of a 90° angle of incidence.

19. The particle image velocimetry system according to claim 17, wherein said hollow tapered optical funnel is an uncoated material having a refractive index at an operating wavelength that is greater than 1.0.

20. The particle image velocimetry system according to claim 19, wherein said uncoated material is a glass material.

21. The particle image velocimetry system according to claim 20, wherein said glass material is PYREX glass.

22. The particle image velocimetry system according to claim 17, wherein said hollow optical waveguide is a hollow optical fiber having a coating of a material selected to reduce transmission losses for the wavelength of the illumination source.

23. The particle image velocimetry system according to claim 22, wherein said coating of said optical fiber is a cyclic olefin polymer coating.

24. The particle image velocimetry system according to claim 17, wherein said illumination source comprises a laser having a 532 nm output wavelength.

25. The particle image velocimetry system according to claim 17, wherein said illumination source comprises a pulsed laser.

26. The particle image velocimetry system according to claim 17, wherein said illumination source comprises a continuous wave laser.

27. The particle image velocimetry system according to claim 25, wherein said pulsed laser is a Nd:YAG pulsed laser having a 532 nm output wavelength.

28. The particle image velocimetry system according to claim 17, wherein said beam shaping optical system comprises an objective lens arranged to receive at least a portion of light that emerges from said output end of said hollow optical waveguide to provide a collimated output beam.

29. The particle image velocimetry system according to claim 28, wherein said beam shaping optical system further comprises a Powell lens arranged to receive said collimated output beam from said objective lens to form a sheet of illumination light.

30. The particle image velocimetry system according to claim 29, wherein said sheet of illumination light has a thickness in a range from about 0.5 mm to about 1.0 mm.

31. The particle image velocimetry system according to claim 29, wherein said sheet of illumination light has a width in a detection region of at least 10 mm.

32. The particle image velocimetry system according to claim 17, wherein said illumination system is able to provide a peak power density of at least 1 $GW/cm^2$.

\* \* \* \* \*